(12) United States Patent
Hayakawa et al.

(10) Patent No.: US 9,134,915 B2
(45) Date of Patent: Sep. 15, 2015

(54) COMPUTER SYSTEM TO MIGRATE VIRTUAL COMPUTERS OR LOGICAL PARITIONS

(71) Applicant: HITACHI, LTD., Tokyo (JP)

(72) Inventors: Norimitsu Hayakawa, Tokyo (JP); Eiichiro Oiwa, Tokyo (JP); Yukari Hatta, Tokyo (JP); Hiroshi Miki, Tokyo (JP); Takuji Teraya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 147 days.

(21) Appl. No.: 13/956,411

(22) Filed: Aug. 1, 2013

(65) Prior Publication Data

US 2014/0059302 A1 Feb. 27, 2014

(30) Foreign Application Priority Data

Aug. 21, 2012 (JP) .................. 2012-181989

(51) Int. Cl.
*G06F 3/06* (2006.01)
*G06F 9/455* (2006.01)

(52) U.S. Cl.
CPC ............ *G06F 3/0644* (2013.01); *G06F 3/0625* (2013.01); *G06F 3/0673* (2013.01); *G06F 9/45558* (2013.01); *G06F 2009/4557* (2013.01)

(58) Field of Classification Search
CPC .......... G06F 2009/4557; G06F 3/0625; G06F 3/0644; G06F 3/0673; G06F 9/45558
See application file for complete search history.

(56) References Cited

U.S. PATENT DOCUMENTS

2013/0014109 A1   1/2013  Hatta et al.

FOREIGN PATENT DOCUMENTS

JP        2008-299509 A      12/2008

*Primary Examiner* — Yong Choe
(74) *Attorney, Agent, or Firm* — Mattingly & Malur, PC

(57) ABSTRACT

A hypervisor as a movement source stores key information, and the key information is registered in a storage using the stored key information through a logical HBA which is used for migration.

12 Claims, 10 Drawing Sheets

FIG. 6A

WWN MANAGEMENT TABLE OF MOVEMENT SOURCE — 1-12-1-1

| ALLOCATION DESTINATION LOGICAL FC-HBA | ALLOCATION WWN MANAGEMENT ID | VALUE OF WWN | STATE | |
|---|---|---|---|---|
| LOGICAL FC-HBA 1-12-1 (HBA1) | WWN1 | 0x2300000011111111 | IN USE | 6-1-1-1 |
| ALTERNATIVE LOGICAL FC-HBA 1-12-1' (HBA1') | WWN1' | 0x2380000011111111 | UNUSED | 6-1-1-2 |

1-12-2-1

| ALLOCATION DESTINATION LOGICAL FC-HBA | ALLOCATION WWN MANAGEMENT ID | VALUE OF WWN | STATE | |
|---|---|---|---|---|
| LOGICAL FC-HBA 1-12-2 (HBA2) | WWN2 | 0x2300000022222222 | IN USE | 6-1-2-1 |
| ALTERNATIVE LOGICAL FC-HBA 1-12-2' (HBA2') | WWN2' | 0x2380000022222222 | UNUSED | 6-1-2-2 |

WWN MANAGEMENT TABLE OF MOVEMENT DESTINATION — 1-22-1-1

| ALLOCATION DESTINATION LOGICAL FC-HBA | ALLOCATION WWN MANAGEMENT ID | VALUE OF WWN | STATE | |
|---|---|---|---|---|
| LOGICAL FC-HBA 1-22-1 (HBA3) | UNALLOCATED | UNALLOCATED | UNUSED | 6-1-3-1 |
| ALTERNATIVE LOGICAL FC-HBA 1-22-1' (HBA3') | UNALLOCATED | UNALLOCATED | UNUSED | 6-1-3-2 |

1-22-2-1

| ALLOCATION DESTINATION LOGICAL FC-HBA | ALLOCATION WWN MANAGEMENT ID | VALUE OF WWN | STATE | |
|---|---|---|---|---|
| LOGICAL FC-HBA 1-22-2 (HBA4) | UNALLOCATED | UNALLOCATED | UNUSED | 6-1-4-1 |
| ALTERNATIVE LOGICAL FC-HBA 1-22-2' (HBA4') | UNALLOCATED | UNALLOCATED | UNUSED | 6-1-4-2 |

FIG. 6B

WWN MANAGEMENT TABLE OF MOVEMENT SOURCE — 1-12-1-1

| ALLOCATION DESTINATION LOGICAL FC-HBA | ALLOCATION WWN MANAGEMENT ID | VALUE OF WWN | STATE | |
|---|---|---|---|---|
| LOGICAL FC-HBA 1-12-1 (HBA1) | WWN1 | 0x2300000011111111 | UNUSED | 6-2-1-1 |
| ALTERNATIVE LOGICAL FC-HBA 1-12-1' (HBA1') | WWN1' | 0x2380000011111111 | IN USE | 6-2-1-2 |

1-12-2-1

| ALLOCATION DESTINATION LOGICAL FC-HBA | ALLOCATION WWN MANAGEMENT ID | VALUE OF WWN | STATE | |
|---|---|---|---|---|
| LOGICAL FC-HBA 1-12-2 (HBA2) | WWN2 | 0x2300000022222222 | UNUSED | 6-2-2-1 |
| ALTERNATIVE LOGICAL FC-HBA 1-12-2' (HBA2') | WWN2' | 0x2380000022222222 | IN USE | 6-2-2-2 |

WWN MANAGEMENT TABLE OF MOVEMENT DESTINATION — 1-22-1-1

| ALLOCATION DESTINATION LOGICAL FC-HBA | ALLOCATION WWN MANAGEMENT ID | VALUE OF WWN | STATE | |
|---|---|---|---|---|
| LOGICAL FC-HBA 1-22-1 (HBA3) | WWN1 | 0x2300000011111111 | IN USE | 6-2-3-1 |
| ALTERNATIVE LOGICAL FC-HBA 1-22-1' (HBA3') | UNALLOCATED | UNALLOCATED | UNUSED | 6-2-3-2 |

1-22-2-1

| ALLOCATION DESTINATION LOGICAL FC-HBA | ALLOCATION WWN MANAGEMENT ID | VALUE OF WWN | STATE | |
|---|---|---|---|---|
| LOGICAL FC-HBA 1-22-2 (HBA4) | WWN2 | 0x2300000022222222 | IN USE | 6-2-4-1 |
| ALTERNATIVE LOGICAL FC-HBA 1-22-2' (HBA4') | UNALLOCATED | UNALLOCATED | UNUSED | 6-2-4-2 |

FIG. 6C

WWN MANAGEMENT TABLE OF MOVEMENT SOURCE   1-12-1-1

| ALLOCATION DESTINATION LOGICAL FC-HBA | ALLOCATION WWN MANAGEMENT ID | VALUE OF WWN | STATE |
|---|---|---|---|
| LOGICAL FC-HBA 1-12-1 (HBA1) | UNALLOCATED | UNALLOCATED | UNUSED |
| ALTERNATIVE LOGICAL FC-HBA 1-12-2' (HBA1') | UNALLOCATED | UNALLOCATED | UNUSED |

6-3-1-1
6-3-1-2

1-12-2-1

| ALLOCATION DESTINATION LOGICAL FC-HBA | ALLOCATION WWN MANAGEMENT ID | VALUE OF WWN | STATE |
|---|---|---|---|
| LOGICAL FC-HBA 1-12-2 (HBA2) | UNALLOCATED | UNALLOCATED | UNUSED |
| ALTERNATIVE LOGICAL FC-HBA 1-12-2' (HBA2') | UNALLOCATED | UNALLOCATED | UNUSED |

6-3-2-1
6-3-2-2

WWN MANAGEMENT TABLE OF MOVEMENT DESTINATION   1-22-1-1

| ALLOCATION DESTINATION LOGICAL FC-HBA | ALLOCATION WWN MANAGEMENT ID | VALUE OF WWN | STATE |
|---|---|---|---|
| LOGICAL FC-HBA 1-22-1 (HBA3) | WWN1 | 0x2300000011111111 | IN USE |
| ALTERNATIVE LOGICAL FC-HBA 1-12-2' (HBA3') | WWN1' | 0x2380000011111111 | UNUSED |

6-3-3-1
6-3-3-2

1-22-2-1

| ALLOCATION DESTINATION LOGICAL FC-HBA | ALLOCATION WWN MANAGEMENT ID | VALUE OF WWN | STATE |
|---|---|---|---|
| LOGICAL FC-HBA 1-22-2 (HBA4) | WWN2 | 0x2300000022222222 | IN USE |
| ALTERNATIVE LOGICAL FC-HBA 1-12-2' (HBA4') | WWN2' | 0x2380000022222222 | UNUSED |

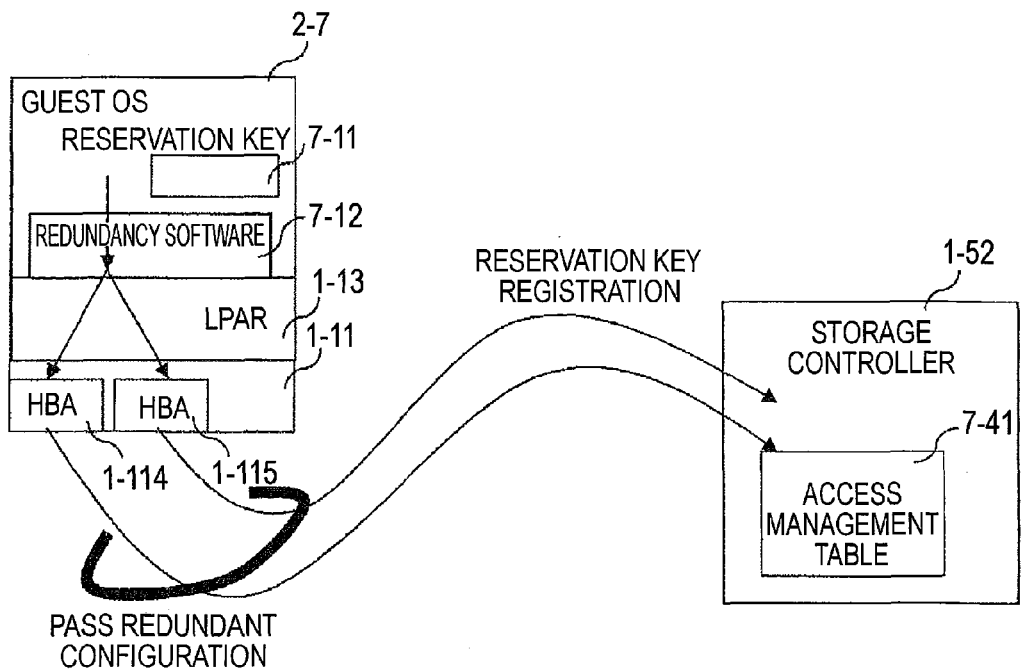

FIG. 8A 7-41

| # | FC-HBA | ALLOCATION WWN | WWN | RESERVATION KEY |
|---|---|---|---|---|
| 1 | LOGICAL FC-HBA 1-12-1 | WWN1 | 0x2300000011111111 ⌇8-11 | abc ⌇8-21 |
| 2 | LOGICAL FC-HBA 1-12-2 | WWN2 | 0x2300000022222222 ⌇8-12 | abc ⌇8-22 |
| 3 | ANOTHER HBA | WWN_A | 0x5000000000000003 ⌇8-13 | xyz ⌇8-23 |
| 4 | ANOTHER HBA | WWN_B | 0x5000000000000004 ⌇8-14 | xyz ⌇8-24 |
| : | : | : | : | : |
| 32 | ANOTHER HBA | WWN_Z | 20xxxxx9 ⌇8-15 | 123 ⌇8-25 |

FIG. 8B 7-41

| # | FC-HBA | ALLOCATION WWN | WWN | RESERVATION KEY |
|---|---|---|---|---|
| 1 | LOGICAL FC-HBA 1-12-1 | WWN1 | 0x2300000011111111 ⌇8-11 | abc ⌇8-21 |
| 2 | LOGICAL FC-HBA 1-12-2 | WWN2 | 0x2300000022222222 ⌇8-12 | abc ⌇8-22 |
| 3 | ANOTHER HBA | WWN_A | 0x5000000000000003 ⌇8-13 | xyz ⌇8-23 |
| 4 | ANOTHER HBA | WWN_B | 0x5000000000000004 ⌇8-14 | xyz ⌇8-24 |
| 5 | ALTERNATIVE LOGICAL FC-HBA 1-12-1' | WWN1' | 0x2380000011111111　8-16 | abc　8-26 |
| 6 | ALTERNATIVE LOGICAL FC-HBA 1-12-2' | WWN2' | 0x2380000022222222　8-17 | abc　8-27 |
| : | : | : | : | : |
| 32 | ANOTHER HBA | WWN_Z | 20xxxxx9 ⌇8-15 | 123 ⌇8-25 |

FIG. 8C 7-41

| # | FC-HBA | ALLOCATION WWN | WWN | RESERVATION KEY |
|---|---|---|---|---|
| 1 | LOGICAL FC-HBA 1-22-1 | WWN1 | 0x2300000011111111 ⌇8-11 | abc ⌇8-21 |
| 2 | LOGICAL FC-HBA 1-22-2 | WWN2 | 0x2300000022222222 ⌇8-12 | abc ⌇8-22 |
| 3 | ANOTHER HBA | WWN_A | 0x5000000000000003 ⌇8-13 | xyz ⌇8-23 |
| 4 | ANOTHER HBA | WWN_B | 0x5000000000000004 ⌇8-14 | xyz ⌇8-24 |
| 5 | | | UNREGISTERED ⌇8-16 | UNREGISTERED ⌇8-26 |
| 6 | | | UNREGISTERED ⌇8-17 | UNREGISTERED ⌇8-27 |
| : | | | : | |
| 32 | ANOTHER HBA | WWN_Z | 20xxxxx9 ⌇8-15 | 123 ⌇8-25 |

FIG. 9

| SYSTEM NAME | CODE | RESERVATION HOLDER | ACCESSIBILITY TO LU | |
|---|---|---|---|---|
| | | | RESERVATION HOLDER | SAME KEY REGISTRANT |
| WRITE EXCLUSIVE | 1h | HBA ISSUED RESERVATION | ACCESSIBLE | INACCESSIBLE |
| EXCLUSIVE ACCESS | 3h | HBA ISSUED RESERVATION | ACCESSIBLE | INACCESSIBLE |
| WRITE EXCLUSIVE -REGISTRANTS ONLY | 5h | HBA ISSUED RESERVATION | ACCESSIBLE | ACCESSIBLE |
| EXCLUSIVE ACCESS -REGISTRANTS ONLY | 6h | HBA ISSUED RESERVATION | ACCESSIBLE | ACCESSIBLE |
| WRITE EXCLUSIVE -ALL REGISTRANTS | 7h | HBA BEING REGISTERED | ACCESSIBLE | — (HANDLED TO BE SAME AS LEFT) |
| EXCLUSIVE ACCESS -ALL REGISTRANTS | 8h | HBA BEING REGISTERED | ACCESSIBLE | — (HANDLED TO BE SAME AS LEFT) |

COMPUTER SYSTEM TO MIGRATE VIRTUAL COMPUTERS OR LOGICAL PARITIONS

INCORPORATION BY REFERENCE

This application claims priority based on Japanese patent application NO. 2012-181989 filed on Aug. 21, 2012 the entire contents of which are Incorporated herein by reference

BACKGROUND OF THE INVENTION

1. Field of the Invention

The present invention relates to a computer system which moves a virtual computer or a logical partition operating on a physical computer onto a physically different computer.

2. Background Art

A virtual computer system in which a plurality of logical partitions (hereinafter, referred to as LPAR) is constructed on a single physical computer, each LPAR is regarded as an individual virtual computer, and an operating system (OS) runs on the LPAR is put into practical use. Accordingly, a single physical computer can function like a plurality of independent computers. This technology utilizes an idle resource of a server and reduction in TCO, such as reduction in power necessary for operating the server.

As a system for realizing an I/O request from the logically partitioned computer (or virtual computer), there are a system (hereinafter, referring to as an I/O emulation system) in which I/O issued from the OS (hereinafter, referred to as guest OS) on the virtual computer is received by a hypervisor once, and re-executed on an OS on which a hypervisor is running or an OS which is separately provided exclusively for execution by proxy, and a system (hereinafter, referred to as an I/O pass-through system) in which a guest OS directly requests a physical I/O device for I/O execution.

In regard to LPAR migration processing in the I/O pass-through system, in JP-A-2008-299509, a world wide name (hereinafter, referred to as WWN) of a fibre channel host bus adapter (FC-HBA) which is allocated to a virtual computer to be moved is inherited to an LPAR as a movement destination such that an access right to the same logical unit (LU) can be inherited from the LPAR as a movement destination. This system is a resolution method relating to LPAR migration of a shutdown system in which a physical computer moves when the guest OS is during shutdown.

Of the systems of migration which moves a virtual computer between different physical computers, a movement system in which movement is made in a state where a guest OS on a hypervisor is running, and a target guest OS on a physical computer as a movement destination is in a state of being continuously operable is called live migration. With the live migration, an access path from the guest OS to an LU is switched from a path which uses a physical device mounted in a physical computer as a movement source to a path which uses a physical device mounted in the physical computer as a movement destination.

In regard to changing the physical device, when an I/O processing system is an I/O emulation system, the hypervisor traps an I/O request (MMIO access) and switches the path of the I/O access in the layers of the hypervisor. When an I/O processing system is an I/O pass-through system, it is necessary that a guest OS to be migrated and a physical computer as a migration destination can access the same LU. To this end, it is necessary that, while a login to Fabric is performed by an LPAR as a movement source, a login to the same Fabric can be performed from an LPAR as a movement source. However, a simultaneous login to Fabric from two different FC-HBAs using the same WWN is not possible. Even when a logout of the FC-HBA as a movement source from Fabric and a login of the movement destination are executed sequentially, the login and logout processing with respect to Fabric request a maximum of tens of seconds.

For this reason, as migration in the I/O pass-through system, the following two methods are considered. (1) There is a method in which a guest OS running on a computer as a movement source is stopped, and a logout of WWN of FC-HBA used in a computer as a movement source is performed during this period, and a login is performed again from FC-HBA as a movement destination, thereby securing an access path to an LU before an LPAR restarts. However, when this system is executed, there is a period in which access from the OS to the disk is not possible, and live migration cannot be realized while the guest OS is continuously running.

As another system, (2) there is a system in which, while the same WWN is used in a logical layer, a different WWN is used in a physical layer. In this system, an alternative connection path to a storage is provided using FC-HBA which uses a logical WWN different from WWN in a normal state. At the time of execution of migration, the path is used temporarily to realize an I/O access. In this system, an alternative path is used to execute an I/O access only at the time of execution of live migration, and the path of WWN used in the normal state ends once. The path of FC-HBA using the logical WWN is initialized in the movement destination before LPAR is moved, and a link from the movement destination is established. Accordingly, it is possible to preliminarily secure the access path from FC-HBA as a movement destination to LU. In this case, the access path is secured preliminarily, whereby it is possible to make the time required for path construction of the I/O access independent from the downtime of the guest OS.

When the system (2) is introduced, it is necessary to correspond to Persistent Reservation command which is an exclusive command of SCSI Primary Commands-3 (SPC-3). This function is a command which is used for exclusive control in a cluster system under a path redundant configuration.

In the Persistent Reservation command, a storage controller stores WWN of a port on the FC-HBA side and Reservation Key generated on the OS side in a pair, and executes exclusive control (there may be another system). For this reason, when WWN of FC-HBA connected to the storage changes in the movement source and the movement destination, even though an LU is not excluded and an access is possible in the access from FC-HBA before the logical WWN changes, an access to LU from FC-HBA after changing to an alternative different logical WWN is not permitted and is rejected.

In the live migration, it is necessary to move a virtual computer without making the guest OS conscious of changing of a physical computer. There is a method in which the movement of the guest OS is detected, exclusive control from FC-HBA as a movement source to LU is cancelled once, the completion of the movement after movement is detected, and exclusive control is performed again before an access from FC-HBA as a movement destination to LU is performed, thereby lifting access restriction. However, in order to realize this method, a handshake with middleware or an OS, a special OS or middleware is required, and it is difficult to apply this method in an open environment which cannot be consistent from middleware to a platform.

SUMMARY OF THE INVENTION

A first physical computer has a first physical HBA, a first hypervisor which logically partitions the first physical HBA to generate a 1st logical HBA and a 1'st logical HBA, and a first virtual computer to which the 1st logical HBA with WWN1 is allocated and on which a first OS accessing the storage device through a rink 1 connecting the 1st logical MBA and the storage device runs. The first OS generates first key information unique to the first OS, the first hypervisor monitors issuance of a first registration request including the first key information by the first OS, acquires the first key information included in the first registration request, stores the first key information in a first storage area of the 1st logical HBA, and transmits the first registration request to a storage controller managing the storage device through the 1st logical HBA, and the first key information included in the first registration request is registered as access management information in the storage controller in association with WWN1 given to the 1st logical HBA passed in the transmission of the first registration request. When migrating the first virtual computer onto a second physical computer, the first hypervisor reads the first key information stored in the first storage area and transmits a second registration request including the read first key information to the storage controller through the 1'st logical HBA, the first key information included in the second registration request is registered as the access management information in the storage controller in association with WWN1' given to the 1'st logical HBA passed in the transmission of the second registration request, when the storage controller receives an access to a logical unit of the storage device from the 1'st logical HBA, access control is executed by determination on whether or not key information associated with WWN1' given to the accessed 1'st logical HBA is the first key information included in the first registration request with reference to the access management information, and the allocation to the first virtual computer is switched from the 1st logical HBA allocated to the first virtual computer to the 1'st logical HBA with the registered WWN1'. While the first virtual computer is migrated onto the second physical computer, the first OS which runs on the first virtual computer switches the allocation to the first virtual computer and accesses the logical unit through a rink 1' connecting the 1'st logical HBA and the storage device.

It is possible to perform live migration in an I/O passthrough system while coping with an exclusive control system in a storage. Other objects, configuration, and effects other than the above-described will become apparent by the following description of an embodiment.

BRIEF DESCRIPTION OF THE DRAWINGS

FIG. 6A shows a WWN management table before movement of an LPAR.
FIG. 6B shows a WWN management table during movement of an LPAR.
FIG. 6C shows a WWN management table after movement of an LPAR.
FIG. 7 shows an operation outline of Persistent Reservation.
FIG. 8A shows an access management table for each LU before movement of an LPAR.

FIG. 8B shows an access management table for each LU during movement of an LPAR.
FIG. 8C shows an access management table for each LU after movement of an LPAR.
FIG. 9 shows a reservation system list of a Persistent Reservation command.

DETAILED DESCRIPTION OF THE INVENTION

Figure 1:
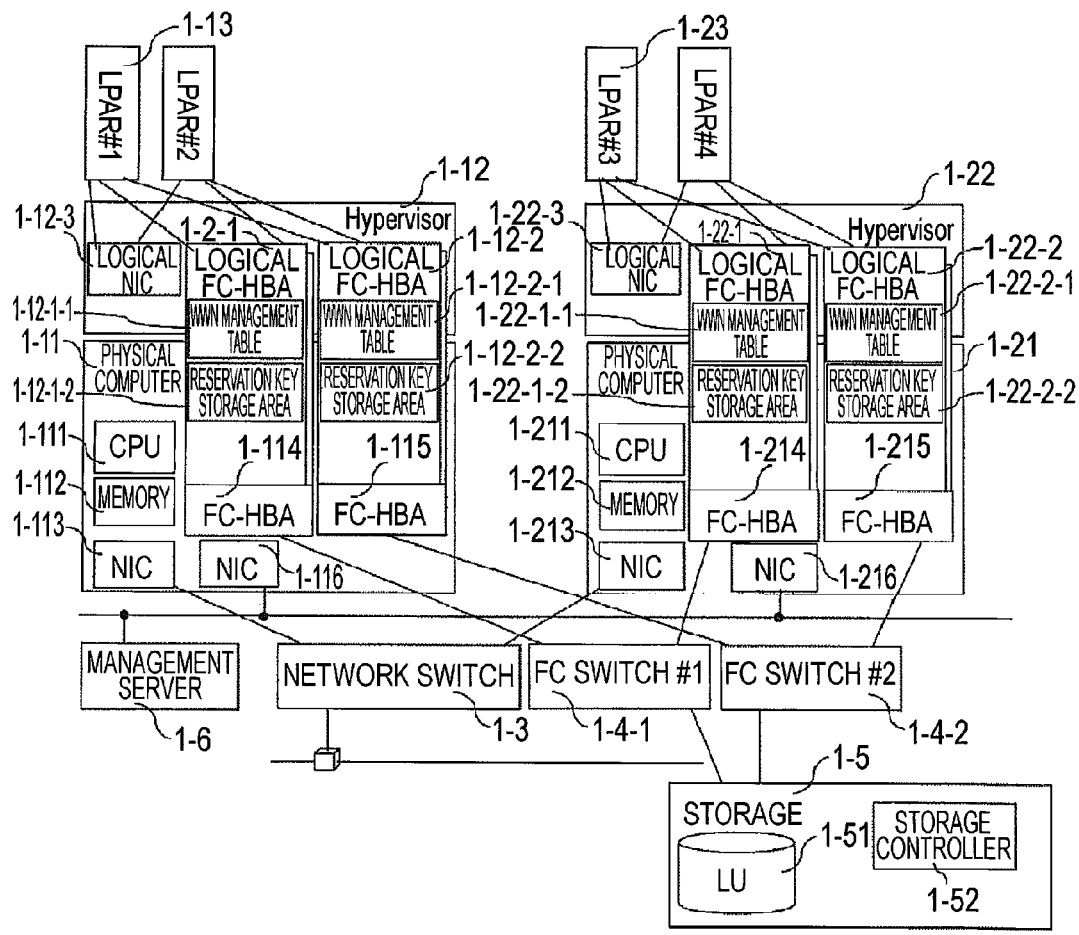
FIG. 1 is an overall configuration diagram of an apparatus.

Hereinafter, examples will be described referring to the drawings.

Example 1

Figure 2:
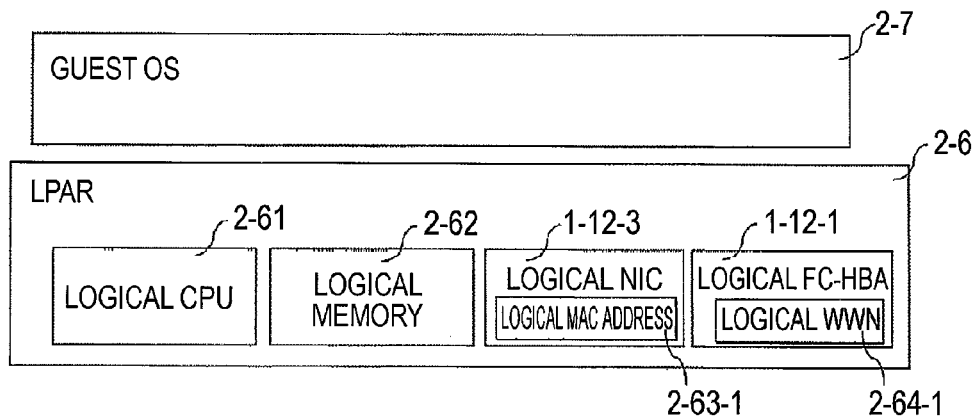
FIG. 2 is a configuration diagram of an LPAR.

FIG. 1 is a configuration diagram of an entire server including a virtualization mechanism centering on hypervisors 1-12 and 1-22. Although two configurations of a movement source configuration (left side) and a movement destination configuration (right side) are described so as to represent LPAR migration, the contents of constituent items are identical. FIG. 2 is a configuration diagram focusing on the configuration of an LPAR. The virtualization mechanism is a virtualization mechanism which uses a logical partition mechanism, and a CPU uses physical CPUs 1-111 and 1-211 with LPAR groups (LPAR#1 1-13, LPAR#2) and (LPAR#3 1-23, LPAR#4) in a time sharing manner. In regard to a memory partition/sharing system, unlike a system in which operation is performed as an application on a host OS, physical memories 1-112 and 1-212 are logically partitioned on hypervisors 1-12 and 1-22, and the physical memories 1-112 and 1-212 are allocated to specific LPARs 1-13 and 1-23 and used.

Hereinafter, constituent elements will be described in order. It is assumed that physical computers 1-11 and 1-21 primarily include CPUs 1-111 and 1-211, memories 1-112 and 1-212, network interface cards (NICs) 1-113 and 1-213 as I/O devices, and fibre channel-host bus adapters (FC-HBAs) 1-114, 1-115, 1-214, and 1-215, respectively. The I/O devices are respectively connected to switches.

The NIC 1-113 and 1-213 are connected to a network switch (LAN Switch) 1-3. The FC-HBAs 1-114 and 1-214 are connect to an FC switch 1-4-1, and the FC-HBAs 1-115 and 1-215 are connected to an FC switch 1-4-2. This configuration is a redundant path of an FC-HBA, and connection is made from different paths of the FC switches 1-4-1 and 1-4-2 to the same storage (storage device) 1-5.

Inside the storage 1-5, there are a logical unit (LU) 1-51 which is an actual storage device, and a storage controller 1-52. A guest operating system (OS) 2-7 shown in FIG. 2 is stored in the LU 1-51.

The hypervisors 1-12 and 1-22 respectively run on the physical computers 1-11 and 1-21, and manage the allocation of resources (the CPUs 1-111 and 1-211, the memories 1-112 and 1-212, the NICs 1-113 and 1-213, and the FC-HBAs 1-114, 1-115, 1-214, and 1-215) of the physical computers. LPAR groups (LPAR#1 1-13, LPAR#2) and (LPAR#3 1-23, LPAR#4) which are a plurality of logical partitions run on the hypervisors 1-12 and 1-22, and execute the guest OS 2-7 of FIG. 2. Here, the LPAR 2-6 corresponds to LPARs 1-13 and 1-23.

The LPAR 2-6 includes a logical CPU 2-61, a logical memory 2-62, a logical NIC 2-63, and a logical FC-HBA 2-64. A logical MAC address 2-63-1 and a logical WWN 2-64-1 are respectively allocated to the logical NIC 2-63 and the logical FC-HBA 1-12-1 by the hypervisors 1-12 and 1-22.

In regard to an I/O device, the physical NICs 1-113 and 1-213 are logically shared between LPAR#1, LPAR#2, LPAR#3, and LPAR#4 by the hypervisors (1-12 and 1-22), and allocated to the respective LPARs such that the logical NICs (1-12-3 and 1-22-3) are inside the respective LPARs (2-63).

Similarly, the physical FC-HBAs 1-114, 1-115, 1-214, and 1-215 are logically shared between the LPAR#1, LPAR#2, LPAR#3, and LPAR#4 by the hypervisors (1-12 and 1-22), and are allocated to the respective LPARs such that the logical FC-HBAs (1-12-1, 1-12-2, 1-22-1, and 1-22-2) are in the respective LPARs (2-64).

In each logical FC-HBA (1-12-1, 1-12-2, 1-22-1, or 1-22-2), there is a WWN management table (1-12-1-1, 1-12-2-1, 1-22-1-1, or 1-22-2-1) which holds the logical WWN allocated to the logical FC-HBA. There is also a Reservation Key storage area (1-12-1-2, 1-12-2-2, 1-22-1-2, or 1-22-2-2) which stores key information (hereinafter, referred to as Reservation Key) of Persistent Reservation.

Figure 3:
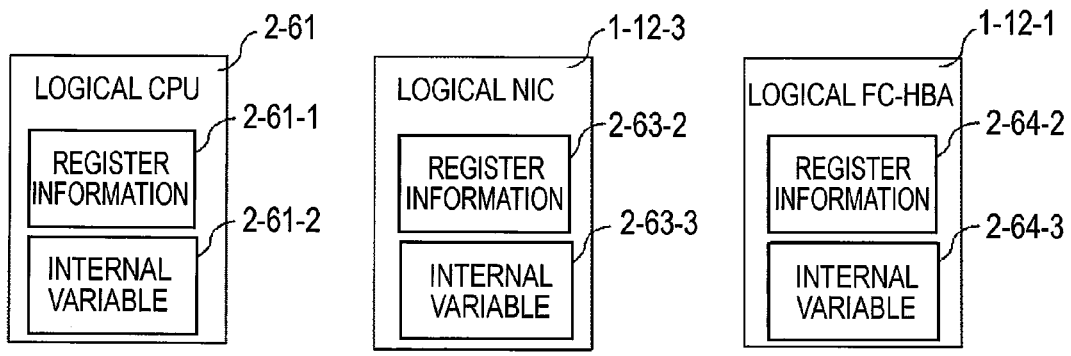
FIG. 3 shows information which should be passed to a movement destination in live migration.

FIG. 3 shows data which should be passed to the movement destination LPAR 1-23 in live migration. As described above, movement of the LPAR 1-13 to the hypervisor 1-22 on the different physical server 1-21 is referred to LPAR migration. At this time, it is necessary to make movement such that the guest OS 2-7 is not conscious of change in configuration to the different physical computer 1-21.

Movement of the LPAR 1-13 while the guest OS 2-7 runs is referred to as live migration. In the live migration, since movement is made while the guest OS 2-7 runs, it is necessary to pass register information 2-61-1 of the logical CPU 2-61, an internal variable 2-61-2, the content of the logical memory 2-62, register information 2-63-2 and 2-64-2 of logical devices (the logical NIC 2-63 and the logical FC-HBA 2-64), internal variables 2-63-3 and 2-64-3 to the movement destination LPAR 1-23. For example, in the internal variable 2-64-3 includes Reservation Key generated by the guest OS 2-7. In the live migration shown in FIG. 3, data which should be passed to the movement destination LPAR 1-23 is transmitted from the movement source to the movement destination by a device/CPU transfer 10-28 of FIG. 10 described below.

Figure 4:
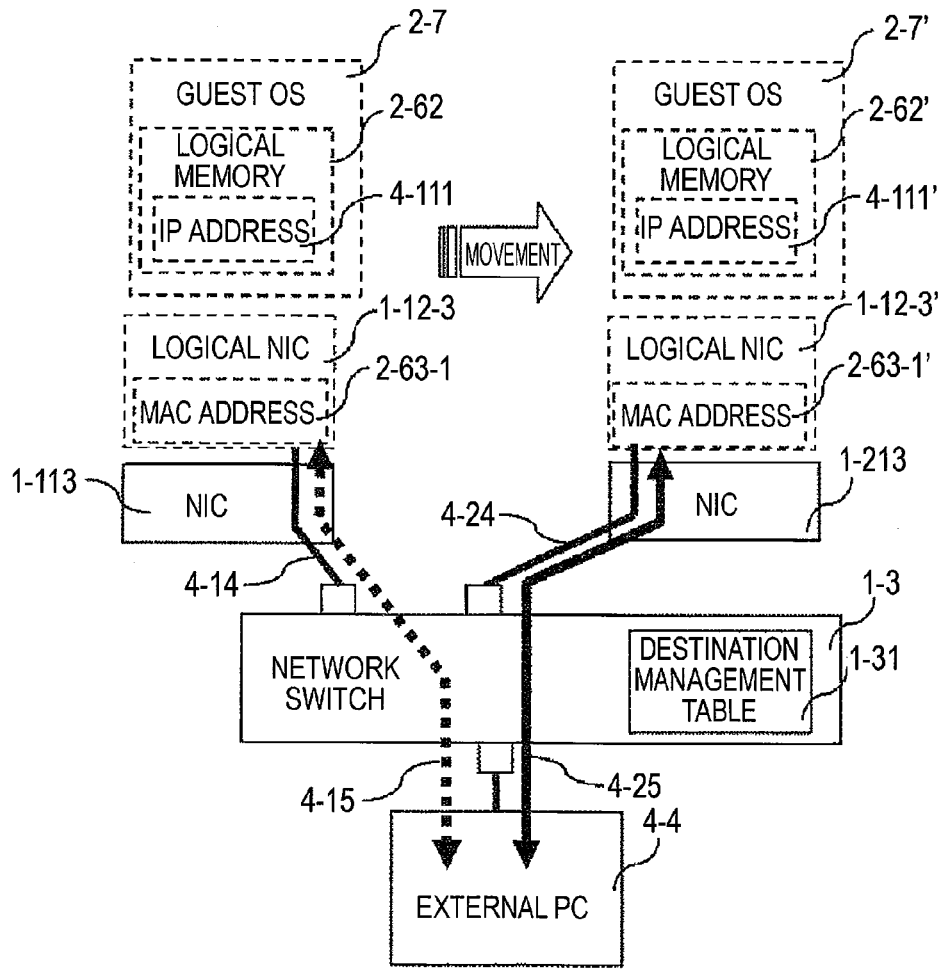
FIG. 4 is a diagram showing connection switching (network) with an external environment in live migration.
Figure 5:
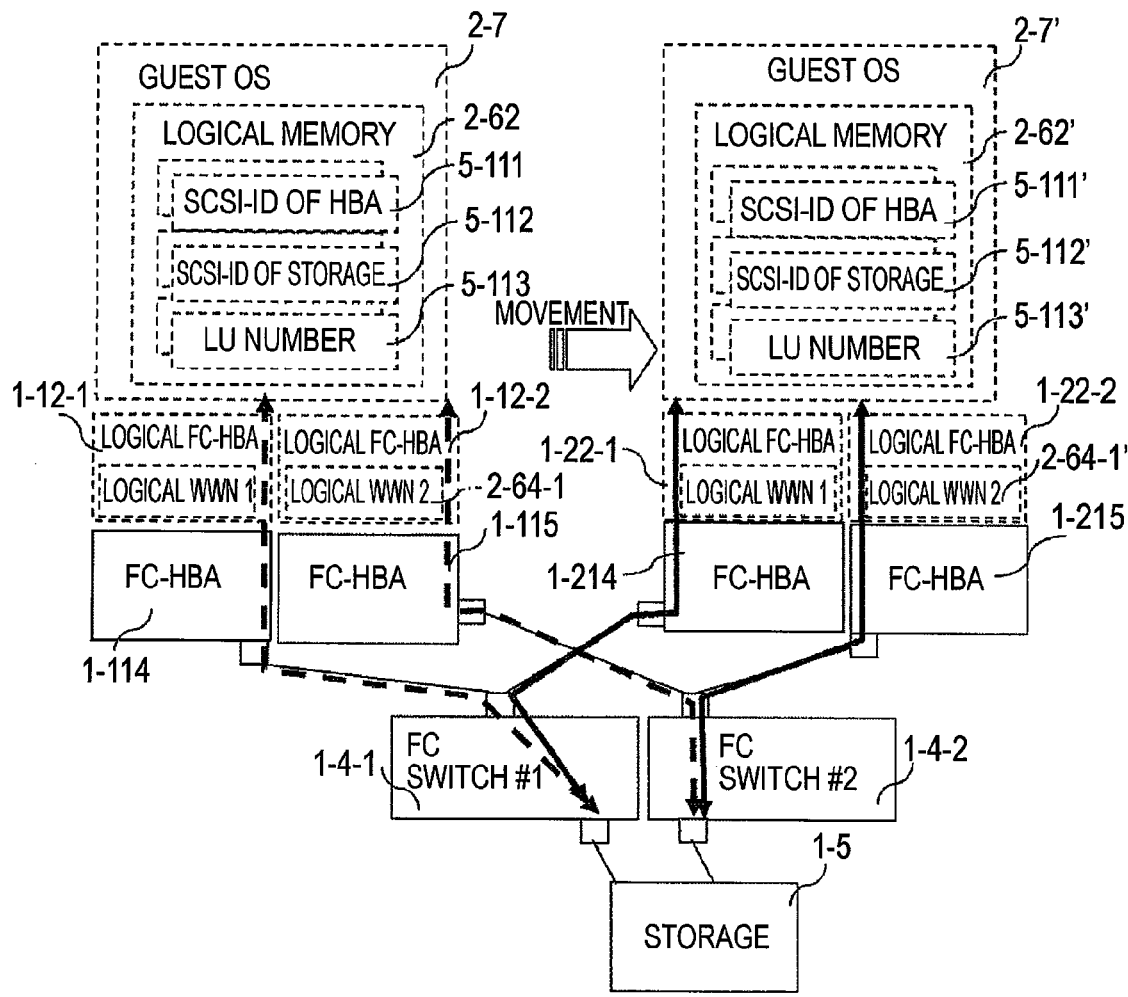
FIG. 5 is a diagram showing connection switching (storage) with an external environment in live migration.

In FIGS. 4 and 5, the maintenance of a connection state between the LPARs 1-13 and 1-23 and an external environment will be described. In FIGS. 4 and 5, parts indicated by broken lines and reference numerals with "'" appended thereto are the same things as the constituent elements of the movement source in which there is no difference when viewed from a higher layer even though movement is made from the movement source to the movement destination by the live migration, and to which the same numbers are logically given and "'" is not appended, and logically pass the respective states in the movement source configuration (left side). In the live migration, it is necessary to make movement while maintaining network connection in the movement source configuration or connection of a storage area network.

FIG. 4 shows the outline of switching relating to a network configuration. As described above, the guest OS 2-7 is an OS which is running on the LPAR 1-13. The logical NIC 2-63 is connected to the network switch 1-3 through the physical NIC 1-113 by the connection path 4-14, and performs communication with an external PC 4-4. In the switching of the network, the MAC address 2-63-1 provided in the logical NIC 2-63, and an IP address 4-111 which is managed on the guest OS 2-7 are passed from the movement source to the movement destination, and after movement, a destination management table 1-31 of the network switch 1-3 is updated. For this reason, even in the movement destination in which a wire connection to the network switch 1-3 differs between a wire connection 4-14 of the movement source and a wire connection 4-24 of the movement destination, a connection relationship 4-15 to the external PC 4-4 in the movement source is updated to a connection relationship 4-25 in the movement destination, connection is maintained, and the network can be used directly after movement.

FIG. 5 shows the outline of switching relating to a storage configuration. The logical FC-HBAs 1-12-1 and 1-12-2 pass through the physical FC-HBAs 1-114 and 1-115 through the layers of the hypervisors 1-12 and 1-22 and are, connected to the FC switches#1 and #2 (1-4-1 and 1-4-2).

In regard to storage connection, the guest OS 2-7 holds the number of 5-113 of the LU 1-51 as an I/O issuance destination. The guest OS 2-7 holds an SCSI-ID 5-111 of the logical FC-HBAs 1-12-1 and 1-12-2, an SCSI-ID 5-112 on the storage side along with the logical WWN 2-64-1 provided in each logical FC-HBA 2-64.

In order to continuously issue I/O from the movement destination to the same LU 1-51, it is necessary to pass the same logical WWN (WWN1, WWN2) 2-64-1 from the movement source to the movement destination. In the I/O pass-through system, a method which switches the connection state from the movement source to the movement destination instantaneously (less than 1 sec) will be described.

There is a method in which different logical WWNs (WWN1' WWN2') held in the WWN management tables 1-12-1-1 and 1-12-2-1 for the logical FC-HBAs 1-12-1 and 1-12-2 allocated to the movement source LPAR 1-13 are allocated to different logical FC-HBAs 1-12-1' and 1-12-2' (the same physical Port is used in a division manner), and an I/O issuance destination is switched so as to be not observed by the higher-layer guest OS 2-7. According to this method, the logical FC-HBA 2-64 having the logical WWN (WWN1, WWN2) 2-64-1 used before movement can be deregistered (released) from Fabric, a login to Fabric is possible newly with the logical WWN (WWN1, WWN2) 2-64-1 in the movement destination, and accordingly, switching (continuation of I/O processing) of I/O issuance processing in the movement destination at the time of execution of live migration can be executed.

FIGS. 6A to 6C show a WWN management table. FIG. 6A shows a WWN management table before movement of the LPAR 2-6. Here, the logical FC-HBA 1-12-1 which is used in I/O issuance from the guest OS 2-7 at this time is defined as HBA1, and an alternative logical FC-HBA 1-12-1' of HBA1 which is used in migration is defined as HBA1'. Similarly, the logical FC-HBA 1-12-2 is defined as HBA2, and an alternative logical FC-HBA 1-12-2' of HBA2 is defined as HBA2'.

WWN1 and WWN1' are given to HBA1 and HBA1' as a logical WWN by the hypervisor 1-12 (6-1-1-1, 6-1-1-2). Similarly, WWN2 and WWN2' are given to HBA2 and HBA2' as a logical WWN by the hypervisor 1-12 (6-1-2-1, 6-1-2-2).

The logical FC-HBA 1-22-1 is defines as HBA3, and an alternative logical FC-HBA of HBA3 is defined as HBA3'. The logical FC-HBA 1-22-2 is defined as HBA4, and an alternative logical FC-HBA of HBA4 is defined as HBA4'.

Before execution of live migration, the logical WWN 2-64-1 (ID, WWN value) of the logical FC-HBAs 1-12-1 and 1-12-2 is registered in the WWN management tables 1-12-1-1 and 1-12-2-1 of the logical FC-HBAs of the movement source. At this time, the logical FC-HBA which is used in I/O issuance from the guest OS 2-7 is the original logical FC-HBA (HBA1, HBA2) and the logical WWN (WWN1, WWN2), instead of the alternative logical FC-HBA (HBA1', HBA2') and the logical WWN (WWN1', WWN2').

In the WWN management tables 1-22-1-1 and 1-22-2-1 of the movement destination, before execution of migration, the IDs of the logical FC-HBA 1-22-1 and 1-22-2 which are used by the LPAR 1-23 subjected to migration are unallocated (6-1-3-1,6-1-4-1).

FIG. 6B shows a WWN management table during movement of the LPAR 2-6. During movement, a logical FC-HBA having a logical WWN (WWN1, WWN2) used in the logical FC-HBA 2-64 of the movement source before movement is released and set to be unused (6-2-1-1, 6-2-2-1). Instead, a different logical WWN (WWN1', WWN2') is allocated to an alternative logical FC-HBA of the movement source, and the alternative logical FC-HBA is set to be in use (6-2-1-2,6-2-2-2). Logical WWNs (WWN1, WWN2) 6-2-1-1 and 6-2-2-1 unused in the movement source are allocated to the logical FC-HBAs (1-22-1, 1-22-2) of the movement destination, and the logical FC-HBAs are set to be in use (6-2-3-1, 6-2-4-1).

FIG. 6C shows a WWN management table after movement of the LPAR 2-6. If the movement is finally completed, the logical FC-HBA 2-64 of the movement source is in an unused state, and the logical WWN2-64-1 is unallocated (6-3-1-1, 6-3-1-2, 6-3-2-1, 6-3-2-2). Accordingly, it is possible to realize instant I/O switching in the live migration in the I/O pass-through system. Although the alternative logical FC-HBA (6-3-3-2, 6-3-4-2) of the movement destination is not used in a sequence of processing, when migration is re-executed, this becomes information of the movement source and used as described above.

In this system, the logical FC-HBAs which are allocated to the movement source LPAR by the hypervisor 1-12 of the movement source are changed from HBA1 and HBA2 to which WWN1 and WWN2 are allocated to the alternative logical FC-HBAs (HBA1' HBA2') to which WWN1' and WWN2' are allocated while being hidden in the guest OS 2-7, such that change of the logical WWN 2-64-1 to be used in I/O does not affect the guest OS 2-7.

In this system, the logical WWN 2-64-1 of the logical FC-HBA2-64 actually being logged is recognized in FC switches 1-4-1 and 1-4-2 and the storage 1-5.

Here, as an example of a method in which recognizes a WWN given to an HBA of a computer in the storage, there is the following method. First, at the time of a login in the HBA of the computer, the storage creates a management table which manages the port ID of the HBA in association with the WWN given to the HBA. If the storage receives a command (I/O) transmitted to the storage through an HBA of a server, since the command passed through the HBA includes the port ID of the HBA, the storage acquires the WWN from the management table based on the port ID of the HBA included in the command. Even when an HBA is a logical HBA and a WWN is a logical WWN, the storage can recognize the logical WWN from the command passed through the logical HBA by the same method.

In the FC switches 1-4-1 and 1-4-2 and the storage 1-5, a particular problem in this system which occurs each time the logical WWN2-64-1 of the logical FC-HBA2-64 being currently logged is recognized will be described below.

Of SCSI commands, as a command for realizing exclusive control, there is a Persistent Reservation command. Here, the exclusive control in this example means that when the storage controller 1-52 receives access to the logical unit (LU) 1-51 of the storage (storage device) 1-5 from the logical HBA, access control is performed with an access right set in Reservation Key (key information) 7-11 associated in the logical WWN 2-64-1 given to the accessed logical FC-HBA 1-12-1 with reference to an access management table 7-41. The access right of Reservation Key (key information) 7-11 is set and changed by a Persistent Reservation command shown in FIG. 9, and determines accessibility to the LU 1-51 from the logical FC-HBA 1-12-1.

FIG. 7 shows the outline of an operation of a Persistent Reservation command. A target system has a configuration in which a pass redundant configuration is assembled using the guest OS 2-7 running on the LPAR 1-13 and the physical FC-HBAs 1-114 and 1-115 allocated to path redundant software 7-12 and the LPAR 1-13.

In this system, a configuration in which a different OS and a cluster configuration are assembled is considered. The guest OS 2-7 as a movement target generates Reservation Key 7-11 unique to the guest OS (or an aggregate unit which performs exclusive control) 2-7. The guest OS 2-7 requests the storage controller 1-52 for exclusive control so as to permit an access to the LU 1-51 from the same OS 2-7 to reject an access from a different OS.

The storage controller 1-52 which receives the request for exclusive control registers the WWN of the FC-HBA with the request issued thereto in the access management table 7-41 managed for each target LU 1-51 along with the designated Reservation Key 7-11. The storage 1-5 stores Reservation Key (key information) 7-11 reserved by Persistent Reservation. Accordingly, according to a certain reservation form, an access to the LU 1-51 from the FC-HBA having the WWN registered along with the same Reservation Key 7-11 as the reserved Reservation Key (key information) 7-11 is possible.

FIGS. 8A to 8C show the concept of an access management table 7-41 for each LU. FIG. 8A shows an access management table 7-41 before movement of the LPAR 2-6 for each LU. The storage controller 1-52 holds the access management table 7-41 for each LU. The access management table 7-41 holds the WWN of the FC-HBA to be accessed in 8-1, and holds Reservation Key 7-11 generated by the guest OS 2-7 in 8-2. There are a plurality of entries. The storage controller 1-52 determines whether to permit or to reject an access to the FC-HBA having the WWN to be accessed on the basis of the access management table 7-41.

In the access management table 7-41 of FIG. 8A, since WWN 8-11 of entry#1 and WWN 8-12 of entry#2 have "abc" as the same Reservation Keys 8-21 and 8-22, an FC-HBA having the WWN 8-11 and an FC-HBA having the WWN 8-12 are a group which is not subjected to exclusive control and is accessible.

When the FC-HBA having the WWN 8-11 of entry#1 is reserved in Persistent Reservation, since HBAs having WWN 8-13 and 8-14 of entry#3 and #4 have "xyz" as different Reservation Keys 8-23 and 8-24, an access to the LU from the different HBAs having the WWN 8-13 and 8-14 of entry#3 and #4 by exclusive control in the storage controller 1-52 can not be performed.

FIG. 8B shows an access management table 7-41 during execution of migration using the I/O pass-through system. The hypervisor 1-12 registers the logical WWN (WWN1', WWN2') of the alternative logical FC-HBA and the same key "abc" as the Reservation Key 7-11 generated by the guest OS 2-7 in the entry #5 and #6 of the access management table 7-41 from the alternative logical FC-HBA (1-12-1 direction is 6-1-1-2, and 1-12-2 direction is 6-1-2-2) (8-16, 8-17, 8-26, 8-27).

FIG. 8C shows an access management table 7-41 after movement of the LPAR 2-6. Thereafter, if migration ends, the hypervisor 1-12 deletes the entries (8-16, 8-17, 8-26, 8-27) for the alternative logical FC-HBAs registered by itself.

Accordingly, it is possible to restore the access management table 7-41 before execution of the migration.

FIG. 9 shows an exclusive control system which is specified by SPC-3. An FC-HBA which has WWN subjected to Reservation by a Persistent Reservation command is referred to as a Reservation holder 9-21. Here, in general, different WWNs are provided in different FC-HBAs even in the same computer, and when the connection path to the storage device is redundant, or the like, the same key is provided so as to distinguish the difference from a different computer and a different FC-HBA of the same computer, thereby determining to be a different FC-HBA of the same computer. An FC-HBA subjected to access determination by the same key is referred to as the same key (Reservation Key) registrant 9-22.

In the case of Write Exclusive (command code: 1h) and Exclusive Access (command code: 3h), while the Reservation holder 9-21 is accessible, an access from FC-HBAs having other WWNs is not possible.

In the case of Write Exclusive-Registrants Only (command code: 5h) and Exclusive Access-Registrants Only (command code: 6h), an access of the same Reservation Key registrant 9-22 as well as the Reservation holder 9-21 is permitted.

In the case of Write Exclusive-All Registrants (command code: 7h) and Exclusive Access-All Registrants (command code: 8h), an FC-HBA (the same Reservation Key registrant 9-22) having the same Reservation Key is handled as the Reservation holder 9-21.

Figure 10:
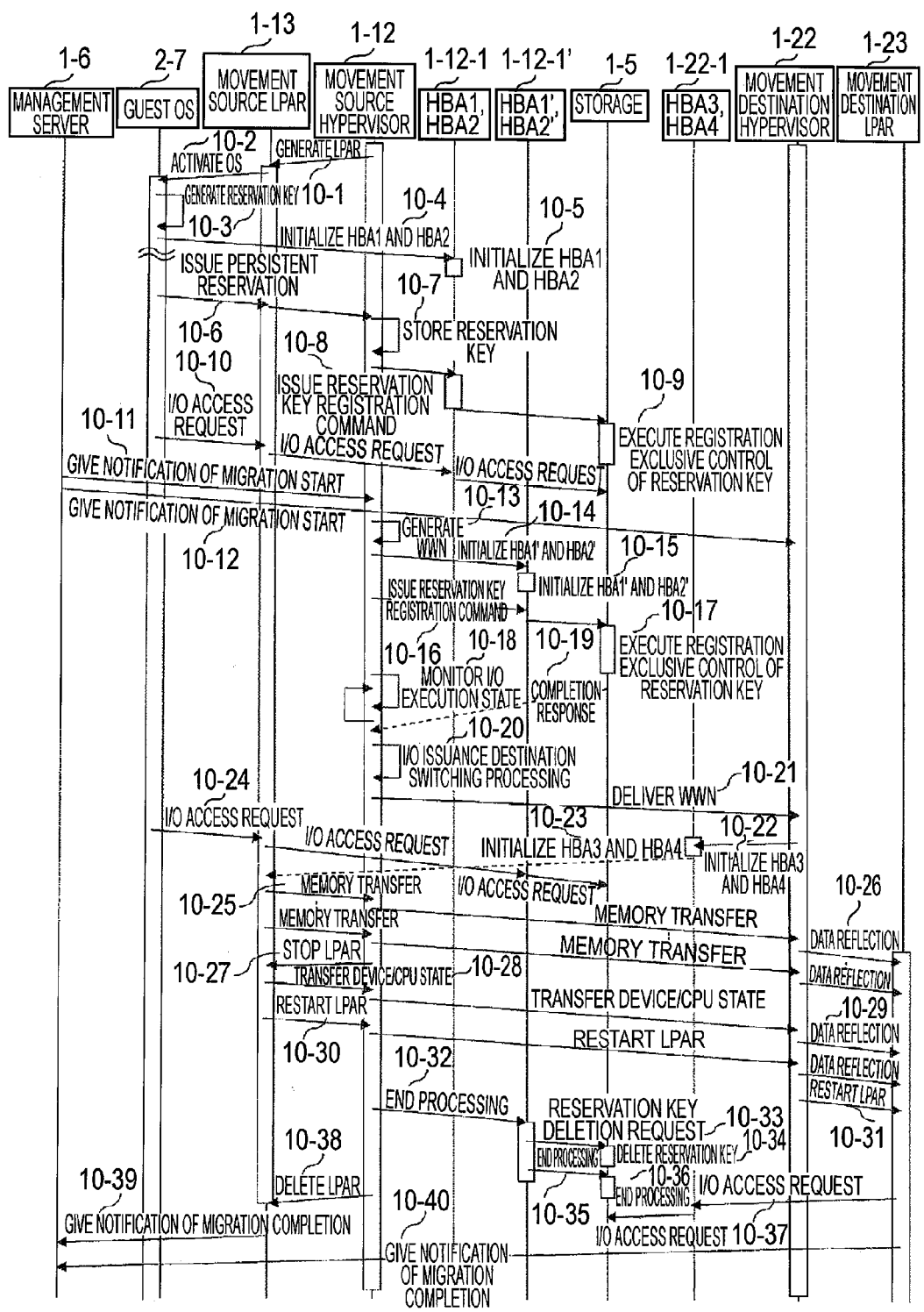
FIG. 10 shows an overall sequence of live migration.

FIG. 10 shows an overall sequence of live migration in this system.

First, the LPAR 1-13 is generated on the hypervisor 1-12 of the movement source (10-1), and the guest OS 2-7 is activated (10-2). Thereafter, the guest OS 2-7 starts preparation for issuing Persistent Reservation so as to realize a cluster configuration.

The guest OS 2-7 generates Reservation Key 7-11 so as to inhibit an access from a different host (10-3). Although the sequence of this processing does not matter, in general, the initialization of the I/O device is performed at the time of the activation of the OS. Specifically, the F/W of the FC-HBA starts, the link is then initialized, and subsequently, a login to Fabric is performed (10-4) (10-5).

In order to register the generated Reservation Key 7-11 in the storage 1-5 in association with the WWNs (WWN1, WWN1') of HBA1 and HBA2, the guest OS 2-7 issues Register of Persistent Reservation to the storage 1-5 (10-6).

The hypervisor 1-12 of the movement source monitors Reservation Key 7-11 for Reservation and stores Reservation Key 7-11 in the Reservation Key storage areas 1-12-1-2 and 1-12-2-2 (10-7). A registration command of Reservation Key 7-11 is issued to the storage 1-5 (10-8), and the storage 1-5 starts to manage Reservation Key 7-11 (10-9). The storage 1-5 stores Reservation Key (key information) 7-11 reserved by Persistent Reservation. Thereafter, a normal operation starts, and the storage 1-5 executes an I/O access taking into consideration exclusive control (10-10).

If the user issues a live migration execution request to a management server 1-6, the management server 1-6 receives the live migration execution request, and gives notification of a migration start request to the movement source hypervisor 1-12 and the movement destination hypervisor 1-22 (10-11, 10-12). Here, a momentum to the start of migration is not limited to a case where the management server 1-6 receives the live migration execution request, and may be a case where predictive disorder in the physical computer 1-11 of the movement source is detected, or invocation for resource standardization.

The movement source hypervisor 1-12 which receives notification of the migration start request initializes alternative logical HBA1' and HBA2' of HBA1 and HBA2 (10-14, 10-15). Thereafter, the movement source hypervisor 1-12 issues the registration command of Reservation Key 7-11 from HBA1' and HBA2' (10-16). As Reservation Key 7-11 to be used at this time, Reservation Key 7-11 stored in the Reservation Key storage areas 1-12-1-2 and 1-12-2-2 in advance in (10-7) is used. Accordingly, on the storage 1-5 side, the same exclusive control as HBA1 and HBA2 used originally is executed for HBA1' and HBA2' (10-17).

Thereafter, as described with reference to FIG. 5, the movement source hypervisor 1-12 changes the allocation of the logical FC-HBA to the movement source LPAR from HBA1 and HBA2 to HBA1' and HBA2' to execute switching of the I/O issuance destination. The movement source hypervisor 1-12 monitors the I/O execution state of HBA1 and HBA2 (10-18), and when I/O is not executed and the completion of the registration of Reservation Key 7-11 is received (10-19), switches the allocation of I/O from HBA1 and HBA2 to HBA1' and HBA2' (10-20).

The movement source hypervisor 1-12 passes the logical WWN (WWN1, WWN2) of HBA1 and HBA2 to the movement destination hypervisor 1-22 when HBA1 and HBA2 are released (10-21). An I/O request (10-24) issued during this time is transferred to the storage 1-5 through HBA1' and HBA2'.

The movement destination hypervisor 1-22 initializes HBA3 and HBA4 (1-22-1) of the movement destination (10-22, 10-23).

The movement source hypervisor 1-12 which confirms the completion of the initialization of the movement destination HBA3 and HBA4 starts memory transfer (10-25) to the movement destination hypervisor 1-22. The movement destination hypervisor 1-22 receives data and executes data reflection in the movement destination (10-26). The movement source hypervisor 1-12 gives notification of an LPAR stop request to the movement source LPAR 1-13 when the amount of data of the memory to be transferred is equal to or smaller than a predetermined amount (10-27).

After the LPAR 1-13 stops, the movement source hypervisor 1-12 transfers device/CPU information to the movement destination hypervisor 1-22 (10-28). As described above, the movement destination hypervisor 1-22 executes reflection of received data (10-29). Thereafter, when data transfer is completed, the movement source hypervisor 1-12 requests the movement destination hypervisor to restart the LPAR (10-30). The movement destination hypervisor 1-22 which receives the restart request instructs the restart request to the movement destination LPAR 1-23 (10-31).

The movement source hypervisor 1-12 which requests to restart the LPAR requests HBA1' and HBA2' for end processing (10-32). HBA1' and HBA2' which receives the end processing request issues a request to delete Reservation Key registered by itself to the storage 1-5 (10-33), and the storage 1-5 deletes Reservation Key (10-34). Thereafter, HBA1' HBA2' executes logout processing as the end processing (10-35). The storage 1-5 side which receives the end request also executes end processing (10-36).

An I/O request (10-37) which is issued by the LPAR 1-23 on the movement destination hypervisor 1-22 is issued to the storage 1-5 through HBA3 and HBA4. The movement source hypervisor 1-12 which receives the completion of the end processing of HBA1' and HBA2' requests for deletion of the movement source LPAR 1-13 (10-38). If the deletion of the movement source LPAR 1-13 is completed, notification of the completion of migration is given from the hypervisor of each of the movement source and the movement destination to the management server 1-6 (10-39) (10-40).

Figure 11:
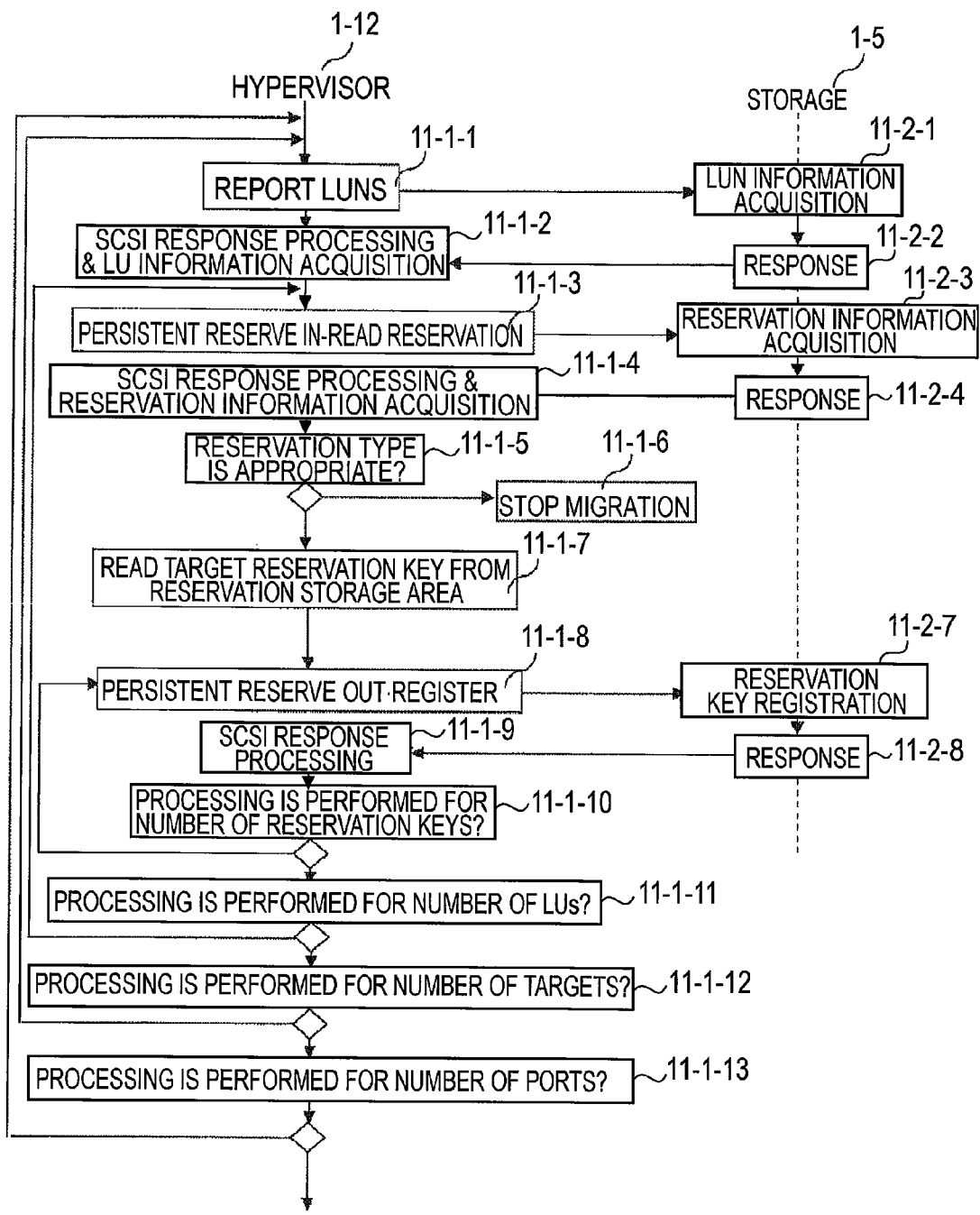
FIG. 11 shows a processing procedure in a hypervisor compatible with Persistent Reservation.

FIG. 11 shows the details of a procedure (10-16) for issuing Persistent Reservation in the hypervisor 1-12. First, the hypervisor 1-12 acquires information of the LU 1-51 to be used by the LPAR 1-13 (uses a REPORT LUNS command, or the like) (11-1-1, 11-2-1, 11-2-2, 11-1-2). Next, the hypervisor 1-12 acquires Reservation Type using Read Reservation for all LUs 1-51 (11-1-3, 11-2-3, 11-2-4, 11-1-4).

When the acquired Reservation Type does not permit an exclusive access (Write Exclusive and Exclusive Access) (11-1-5), an access from ports having different WWNs is inhibited. For this reason, subsequent processing stops, and migration stops (11-1-6). Otherwise, if even an FC-HBA having a different WWN has the same Reservation Key, an access is possible, and the subsequent processing is performed.

Next, the hypervisor 1-12 reads Reservation Key 7-11 to be used in HBA1 and HBA2 (1-12-1) from the Reservation Key storage areas 1-12-1-2 and 1-12-2-2 of the target LU 1-51 (11-1-7). REGISTER is executed using Reservation Key 7-11 read through alternative HBA1' and HBA2' (1-12-1') corresponding to HBA1 and HBA2 (1-12-1) (11-1-8,11-1-9). The storage 1-5 side which receives a REGISTER request executes the registration of Reservation Key (11-2-7), and returns a response (11-2-8).

The above processing is executed for Reservation Keys registered in the LU from HBA1 and HBA2 (1-12-1) (11-1-10). The above processing (11-1-3 to 11-1-10) is executed for the number of LUs which are connected to a target, to which HBA1 and HBA2 (1-12-1) are connected (11-1-11). After the processing is completed, the same processing (11-1-1 to 11-1-11) is executed for a different storage to which the LPAR 1-13 is connected (11-1-12). The same processing (11-1-1 to 11-1-12) is executed for the number of ports of a logical FC-HBA (corresponding to 1-12-1) which is allocated to the LPAR 1-13 (11-1-13). If the above processing is executed, an access to the target LU 1-51 can be continuously performed from ports having physically different WWNs.

In regard to the processing which is performed in the FC-HBA of the movement destination, during a period in which the OS is performed in the movement source LPAR, the registration processing of Reservation Key may be executed using a different physical FC-HBA having a movement source configuration in the movement source.

Figure 12:
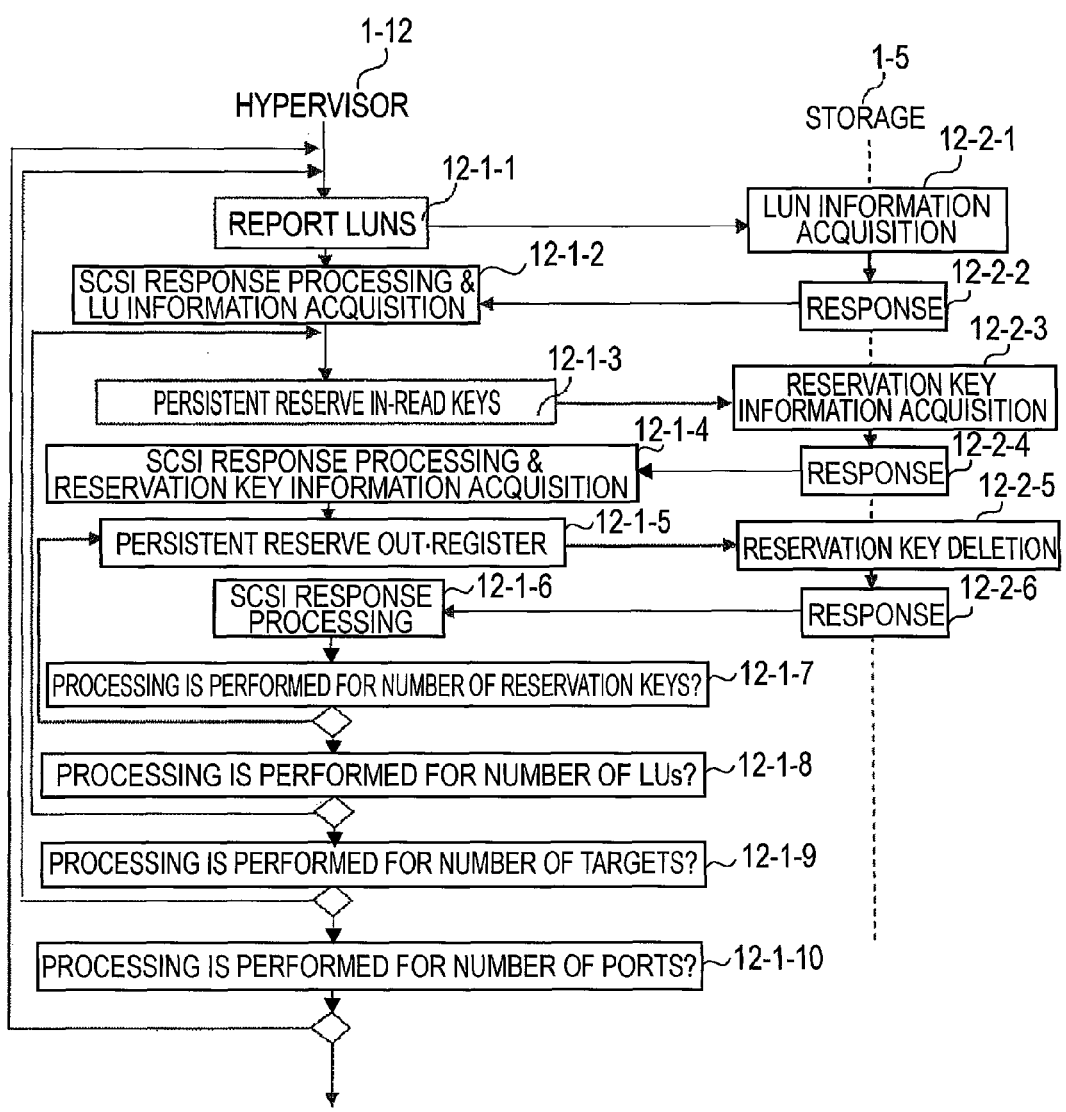
FIG. 12 shows deletion processing of a registered Reservation Key.

FIG. 12 shows the details of deletion (10-33) of the above-described Reservation Key. In the live migration, since the guest OS 2-7 does not end, it is necessary to delete Reservation Key finally in the movement source. However, since the guest OS 2-7 is not present in the movement source, the hypervisor 1-12 of the movement source executes deletion of Reservation KEY through the FC-HBA of the movement source. Although the flow of basic processing is the same as in FIG. 11, a subcommand when issuing REGISTER is deletion (12-1-5). In this processing, error processing for deleting information registered in the movement destination at the time of LPAR migration failure is also performed.

What is claimed is:

1. A computer system comprising:
a plurality of physical computers each having a memory and a central processing unit (CPU); and
a storage device,
wherein a virtual computer generated by logically partitioning the memory and the CPU by a hypervisor operates on the physical computer,
a first physical computer has
a first physical host bus adapter (HBA),
a first hypervisor which logically partitions the first physical HBA to generate a 1st logical HBA and a 1'st logical HBA, and
a first virtual computer to which the 1st logical HBA with world wide name (WWN) 1 is allocated and on which a first operating system (OS) accessing the storage device through a link 1 connecting the 1st logical HBA and the storage device runs,
the first OS generates first key information unique to the first OS,
the first hypervisor monitors issuance of a first registration request including the first key information by the first OS, acquires the first key information included in the first registration request, stores the first key information in a first storage area of the 1st logical HBA, and transmits the first registration request to a storage controller managing the storage device through the 1st logical HBA,
the first key information included in the first registration request is registered as access management information in the storage controller in association with WWN1 given to the 1st logical HBA passed in the transmission of the first registration request,
when migrating the first virtual computer onto a second physical computer, the first hypervisor reads the first key information stored in the first storage area and transmits a second registration request including the read first key information to the storage controller through the 1'st logical HBA,
the first key information included in the second registration request is registered as the access management information in the storage controller in association with a second world wide name (WWN1') given to the 1'st logical HBA passed in the transmission of the second registration request,
when the storage controller receives an access to a logical unit of the storage device from the 1'st logical HBA, access control is executed by determination on whether or not key information associated with WWN1' given to the accessed 1'st logical HBA is the first key information included in the first registration request with reference to the access management information,
the allocation to the first virtual computer is switched from the 1st logical HBA allocated to the first virtual computer to the 1'st logical HBA with the registered WWN1', and
while the first virtual computer is migrated onto the second physical computer, the first OS which runs on the first virtual computer switches allocation to the first virtual computer, and accesses the logical unit through a link 1' connecting the 1'st logical HBA and the storage device.

2. The computer system according to claim 1,
wherein the first hypervisor transmits the second registration request to the storage controller, and
when the first OS which runs on the first virtual computer accesses the logical unit through the link 1' connecting the 1'st logical HBA and the storage device,
access control is executed by determination on whether or not key information associated with WWN1' given to the accessed 1'st logical HBA is the first key information included in the first registration request on the basis of the access management information in the storage controller, and an access to the logical unit is permitted by the result of determination that the key information associated with WWN1' given to the accessed 1'st logical HBA is the first key information.

3. The computer system according to claim 2,
wherein the first hypervisor transmits WWN1 to the second physical computer,
the second physical computer has
a second physical HBA, and
a second hypervisor which receives WWN1 from the first hypervisor and logically partitions the second physical HBA to generate a second logical HBA with WWN1,
the first hypervisor transmits information of a memory corresponding to the first virtual computer,
the second hypervisor receives information of the memory corresponding to the first virtual computer,
a second virtual computer is generated on the basis of the received information of the memory corresponding to the first virtual computer, allocates the second logical HBA to the second virtual computer, and operates the first OS migrated from the first virtual computer on the second virtual computer, and
the first OS which runs on the second virtual computer accesses the logical unit through a link 2 connecting the second logical HBA with WWN1 and the storage device.

4. The computer system according to claim 3,
wherein the first hypervisor transmits the first registration request to the storage controller, and
when the first OS which runs on the second virtual computer accesses the logical unit through the link 2 connecting the second logical HBA and the storage device,
access control is executed by determination on whether or not key information associated with WWN1 given to the accessed second logical HBA is the first key information included in the first registration request on the basis of the access management information in the storage controller, and an access to the logical unit is permitted by the result of determination that the key information associated with WWN1 given to the accessed second logical HBA is the first key information.

5. The computer system according to claim 4,
wherein the first physical computer has a third physical HBA,
the first hypervisor logically partitions the third physical HBA to generate a 3rd logical HBA and a 3'rd logical HBA, and allocates the 3rd logical HBA with a third world wide name (WWN3) to the first virtual computer,
the first OS which runs on the first virtual computer accesses the storage device through a link 3 connecting the 3rd logical HBA and the storage device or the link 1,
the first hypervisor monitors issuance of the first registration request including the first key information by the first OS, acquires the first key information included in the first registration request, stores the first key information in a third storage area of the 3rd logical HBA, and transmits the first registration request to the storage controller managing the storage device through the 3rd logical HBA,
the first key information included in the first registration request is registered as the access management information in the storage controller in association with WWN3 given to the 3rd logical HBA passed in the transmission of the first registration request,
when migrating the first virtual computer onto the second physical computer, the first hypervisor reads the first key information stored in the third storage area and transmits a third registration request including the read first key information to the storage controller through the 3'rd logical HBA, the first key information included in the third registration request is registered as the access management information in the storage controller in association with a fourth world wide name (WWN3') given to the 3'rd logical HBA passed in the transmission of the third registration request,
when the storage controller receives an access to the logical unit of the storage device from the 3'rd logical HBA, access control is executed by determination on whether or not key information associated with WWN3' given to the accessed 3'rd logical HBA is the first key information included in the first registration request with reference to the access management information,
the allocation to the first virtual computer is switched from the 3rd logical HBA allocated to the first virtual computer to the 3'rd logical HBA with the registered WWN3', and
while the first virtual computer is migrated onto the second physical computer, the first OS which runs on the first virtual computer switches the allocation to the first virtual computer and accesses the logical unit through a link 3' connecting the 3'rd logical HBA and the storage device or the link 1'.

6. The computer system according to claim 5,
wherein the first hypervisor transmits the third registration request to the storage controller, and
when the first OS which runs on the first virtual computer accesses the logical unit through the link 3' connecting the 3'rd logical HBA and the storage device,
access control is executed by determination on whether or not key information associated with WWN3' given to the accessed 3'rd logical HBA is the first key information included in the first registration request on the basis of the access management information in the storage controller, and an access to the logical unit is permitted by the result of determination that the key information associated with WWN3' given to the accessed 3'rd logical HBA is the first key information.

7. The computer system according to claim 6,
wherein the first hypervisor transmits WWN3 to the second physical computer,
the second physical computer has a fourth physical HBA,
the second hypervisor receives WWN3 from the first hypervisor and logically partitions the fourth physical HBA to generate a fourth logical HBA with WWN3,
the second hypervisor allocates the fourth logical HBA to the second virtual computer and operates the first OS migrated from the first virtual computer on the second virtual computer, and
the first OS which runs on the second virtual computer accesses the logical unit through a link 4 connecting the fourth logical HBA with WWN3 and the storage device or the link 2.

8. The computer system according to claim 7,
wherein the first hypervisor transmits the first registration request to the storage controller, and
when the first OS which runs on the second virtual computer accesses the logical unit through the link 4 connecting the fourth logical HBA and the storage device,
access control is executed by determination on whether or not key information associated with WWN3 given to the accessed fourth logical HBA is the first key information included in the first registration request on the basis of the access management information in the storage controller, and an access to the logical unit is permitted by the result of determination that the key information associated with WWN3 given to the accessed fourth logical HBA is the first key information.

9. A computer system comprising:
a plurality of physical computers each having a memory and a central processing unit (CPU); and
a storage device,
wherein a virtual computer generated by logically partitioning the memory and the CPU by a hypervisor operates on the physical computer,
a first physical computer has
a first physical host bus adapter (HBA),
a first hypervisor which logically partitions the first physical HBA to generate a 1st logical HBA and a 1'st logical HBA, and
a first virtual computer to which the 1st logical HBA with a first world wide name (WWN1) is allocated and on which a first operating system (OS) accessing the storage device through a link 1 connecting the 1st logical HBA and the storage device runs,
the first OS generates first key information unique to the first OS,
the first hypervisor monitors issuance of a first registration request including the first key information by the first OS, acquires the first key information included in the first registration request, stores the first key information in a first storage area of the 1st logical HBA, and transmits the first registration request to the storage device through the 1st logical HBA,
the storage device has
a logical unit, and
a storage controller which receives the first registration request transmitted through the 1st logical HBA and manages the first key information included in the first registration request as access management information in association with WWN1 given to the 1st logical HBA passed in the transmission of the first registration request,
when migrating the first virtual computer onto the second physical computer, the first hypervisor reads the first key information stored in the first storage area and transmits a second registration request including the read first key information to the storage device through the 1'st logical HBA,
the storage controller manages the first key information included in the second registration request as the access management information in association with a second world wide name (WWN1') given to the 1'st logical HBA passed in the transmission of the second registration request,
when the storage controller receives an access to the logical unit from the 1'st logical HBA, access control is executed by determination on whether or not key information associated with WWN1' given to the accessed 1'st logical HBA is the first key information included in the first registration request with reference to the access management information,
the first hypervisor switches the allocation to the first virtual computer from the 1st logical HBA allocated to the first virtual computer to the 1'st logical HBA with the registered WWN1', and
while the first virtual computer is migrated onto the second physical computer, the first OS which runs on the first virtual computer switches the allocation to the first virtual computer and accesses the logical unit through a link 1' connecting the 1'st logical HBA and the storage device.

10. The computer system according to claim 9,
wherein, if an access to the logical unit is received from the 1'st logical HBA allocated to the first virtual computer, the storage controller performs access control by determination on whether or not key information associated with WWN1' given to the accessed 1'st logical HBA is the first key information included in the first registration request with reference to the access management information, and permits an access to the logical unit by the result of determination that the key information associated with WWN1' given to the accessed 1'st logical HBA is the first key information.

11. The computer system according to claim 10,
wherein the first hypervisor transmits WWN1 to the second physical computer,
the second physical computer has
a second physical HBA, and
a second hypervisor which receives WWN1 from the first hypervisor and logically partitions the second physical HBA to generate a second logical HBA with WWN1,
the first hypervisor transmits information of a memory corresponding to the first virtual computer,
the second hypervisor receives information of the memory corresponding to the first virtual computer,
a second virtual computer is generated on the basis of the received information of the memory corresponding to the first virtual computer, allocates the second logical HBA to the second virtual computer, and operates the first OS migrated from the first virtual computer, and
the first OS which runs on the second virtual computer accesses the logical unit through a link 2 connecting the second logical HBA with WWN1 and the storage device.

12. The computer system according to claim 11,
wherein, if an access to the logical unit is received from the second logical HBA allocated to the second virtual computer, the storage controller performs access control by determination on whether or not key information associated with WWN1 given to the accessed second logical HBA is the first key information of the first registration request with reference to the access management information, and permits an access to the logical unit by the result of determination that the key information associated with WWN1 given to the accessed second logical HBA is the first key information.

* * * * *